March 31, 1970  H. MÜLLER ET AL  3,503,625
LATERAL BRACE FOR THE LOWER LIFT GUIDE RODS
OF TRACTORS OR THE LIKE
Filed June 11, 1968  6 Sheets-Sheet 4
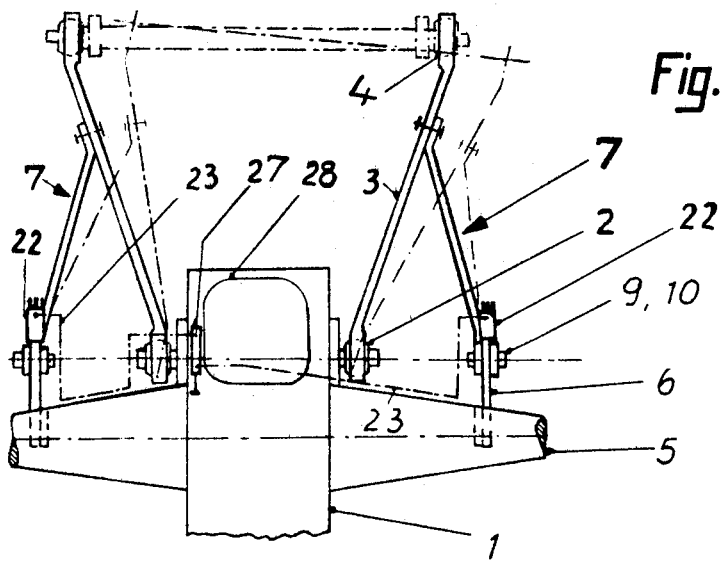
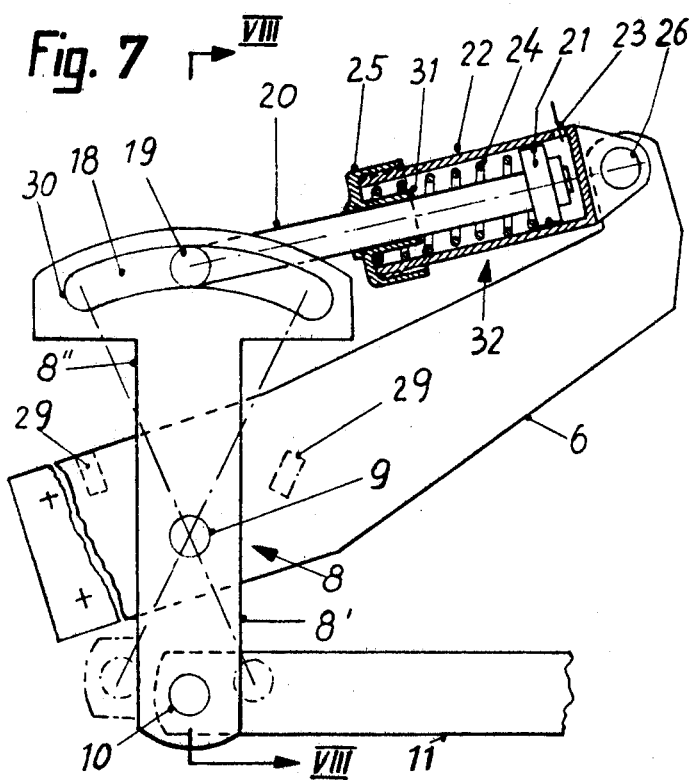
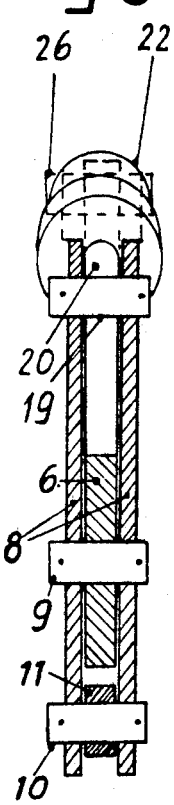
INVENTORS
HUBERT MÜLLER
HERMANN FENDT
BY Craig & Antonelli
ATTORNEYS

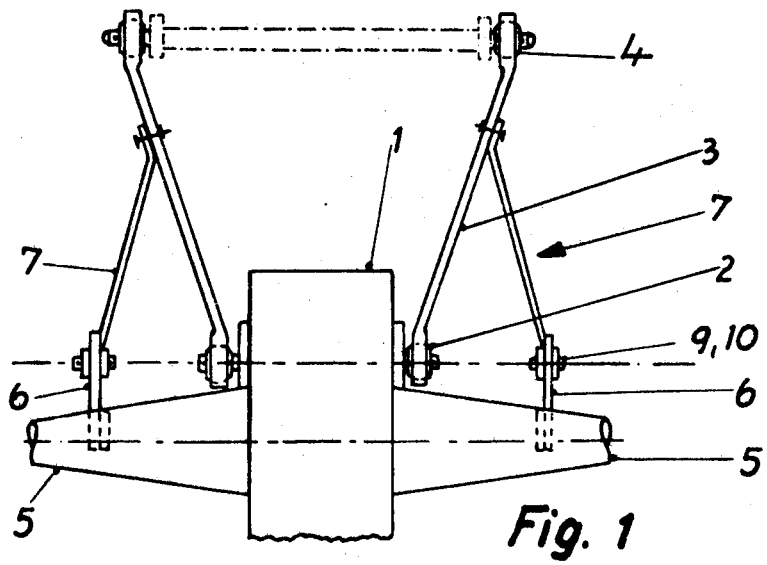
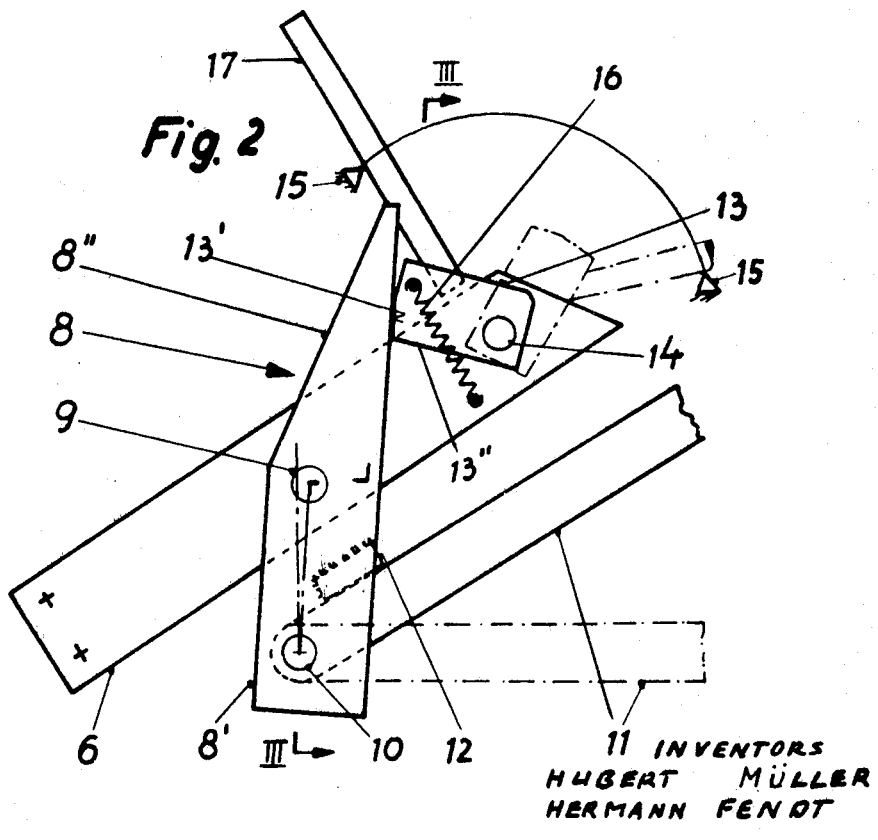

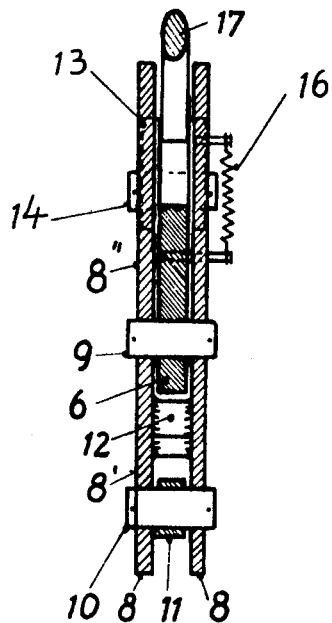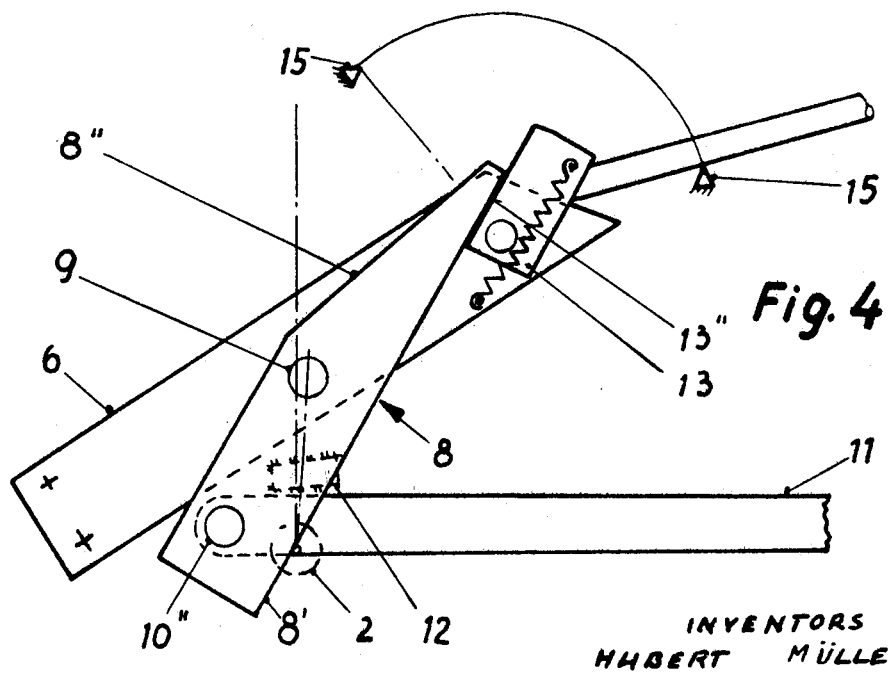

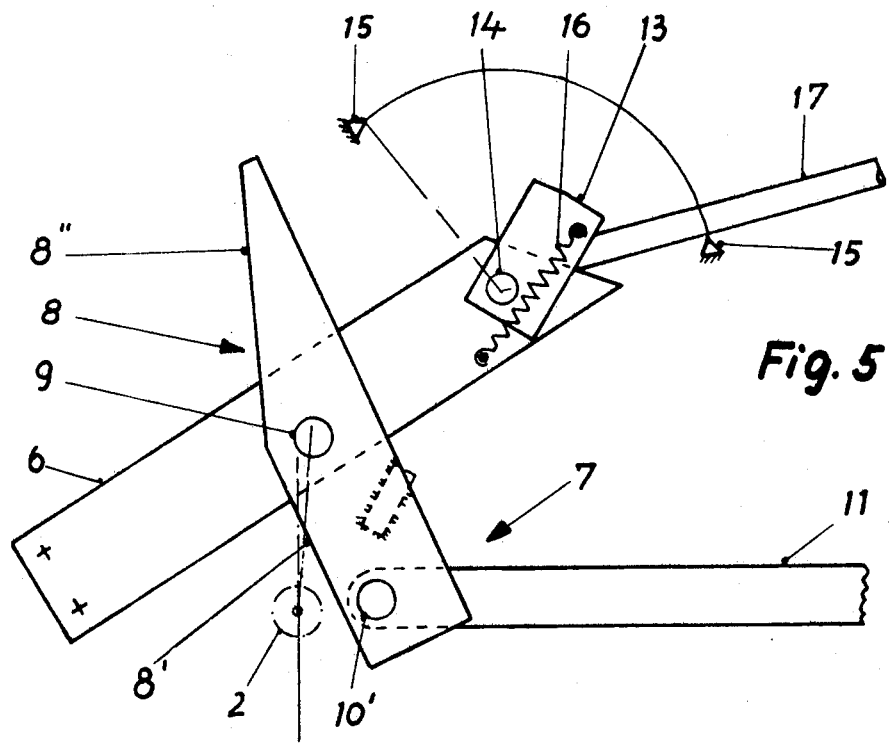

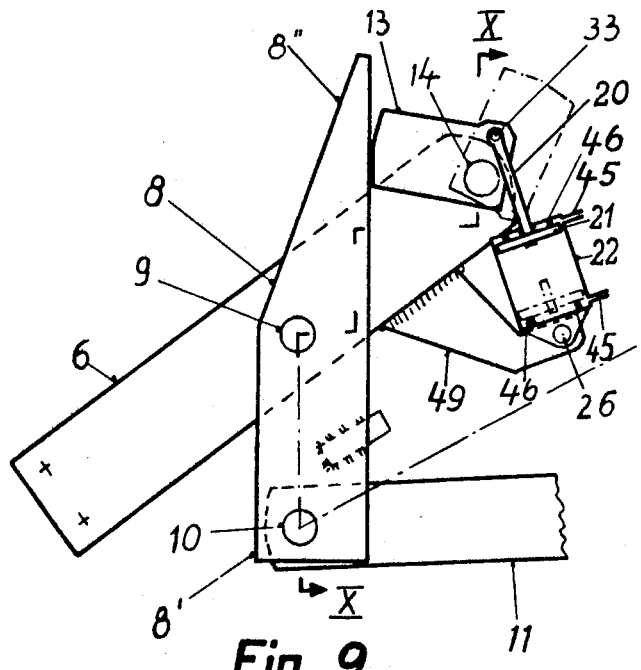
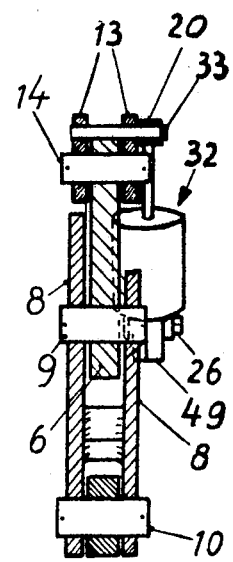
Fig. 9    Fig. 10
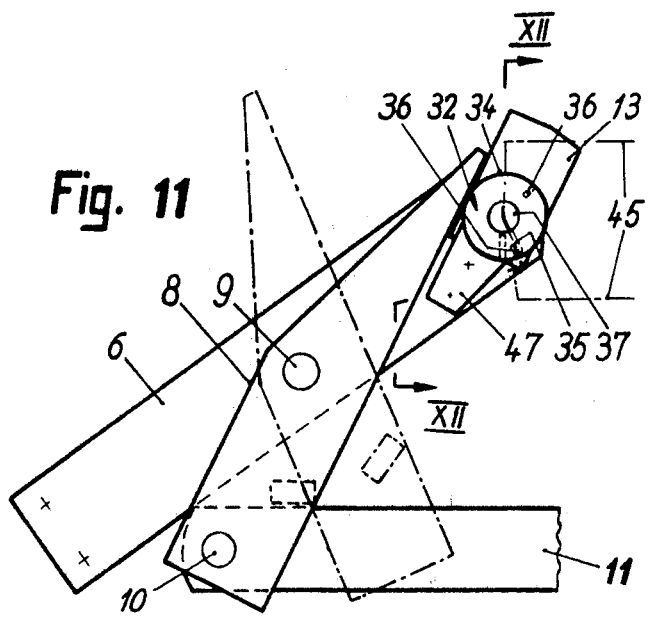
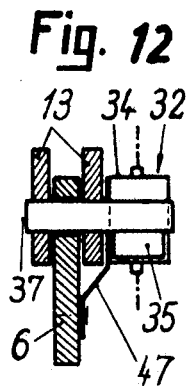
Fig. 11    Fig. 12

United States Patent Office 3,503,625
Patented Mar. 31, 1970

3,503,625
LATERAL BRACE FOR THE LOWER LIFT GUIDE
RODS OF TRACTORS OR THE LIKE
Hubert Müller and Hermann Fendt, Marktoberdorf,
Germany, assignors to Xaver Fendt & Co., Marktoberdorf, Germany
Filed June 11, 1968, Ser. No. 736,107
Claims priority, application Germany, July 26, 1967,
F 53,066
Int. Cl. B60d 1/00; A01b 3/24
U.S. Cl. 280—474                                    20 Claims

ABSTRACT OF THE DISCLOSURE

A lateral brace arrangement for the lower lift guide rods of a tractor or like vehicle, which provides for the selective limitation or complete preclusion of lateral motion of an implement connected to the lower lift guide rods. The brace includes pivoted strut sections connected, on each side of the vehicle, at one end of the lower lift guide rod, and at the other end, to a part of the tractor body. The present invention provides for the reltaively-movable pivot axis of the pivoted strut sections to include, in its path of motion, a point at which said pivot axis is coaxial with the axis of the fulcrums at which the lower lift guide rods are attached to the body of the tractor and, further, provides for the selective locking of the strut sections in such a position. The present invention further provides suitable control means for remotely operating the selective locking means from a position in the region of the driver's seat of the vehicle.

The present invention relates to a lateral brace for the lower lift guide rods of tractors or the like, provided in order to prevent or limit the lateral mobility of an implement coupler thereto; this lateral brace comprises supporting struts constructed in the form of hinged rods wherein a short strut section is pivotally attached to the vehicle laterally of the fulcrum on the tractor side of the lower guide rod pertaining thereto, and with a long strut section coupled to the respective lower guide rod.

Lateral supports serve the purpose of preventing, or permitting within certain limits, selectively, the lateral motion of an implement connected to the coupling linkage.

A supporting strut for the lower lift guide rods has been known which is constructed as a radius rod and which is pivoted to the lower guide rod, as well as to a bearing bolt rigidly-mounted to the vehicle and supported, coaxially with respect to the fulcrum of the lower guide rod, on the side of the vehicle. With such an arrangement, the path of movement of the hinge axis of the supporting strut is disposed beneath the fulcrum of the lower guide rod. In order to convert from a laterally-rigid mode to a laterally-mobile mode, it is necessary to make respective changes in placement of the supporting strut at the lower guide rod. Toward this end, the coupling of each point of connection must be individually released and must again be closed after introduction into the appropriate mounting bore. The driver must dismount in order to conduct these changing operations. Furthermore, such a conversion can be carried out only in a cumbersome manner, particularly when an implement is attached, since the accessibility to the points of coupling is limited, and the point of connection is under tension.

Thus, it is an object of the present invention to provide a support deivce for the lower lift guide rods of a tractor or the like which overcomes the disadvantages inherent in the conventional devices of this type.

Further, it is an object of the present invention to provide a lateral brace for the lower lift guide rods of a tractor or the like which can effectively prevent lateral motion of an implement attached to the lower lift guide rods or, in the alternative, can permit such lateral motion within predetermined limits.

It is a further object of the present invention to provide a lateral brace for the lower lift guide rods of a tractor or the like, which can be efficiently converted from a laterally-rigid mode to a laterally-mobile mode.

Finally, it is an object of the present invention to provide a lateral brace for the lower lift guide rods of a tractor or the like, which can be converted from a laterally-rigid mode to a laterally-mobile mode and vice versa by controls opearted from the driver's seat of the tractor.

In accordance with the present invention, the disadvantages noted above with respect to the conventional devices are overcome by providing the axis of the fulcrums of the lower guide rods on the side of the tractor in the path of movement of the pivot axis of the supporting struts, and by providing an adjustable pawl which can effectively lock the short strut section of the supporting struts in a position wherein the axis of the fulcrums and the pivot axis are positioned coaxially with respect to each other.

In accordance with a further embodiment of the present invention a particularly advantageous construction is effecter by providing an abutment at the short strut section, which abutment is positioned such that the long strut section engages this abutment, at least in a transporting position.

One embodiment of the present invention is illustrated in the drawing and the detailed description below. In the drawings:

FIGURE 1 is a top view of the lower lift guide rods with lateral bracing;

FIGURE 2 is a partial view of the lateral brace on an enlarged scale as arranged for providing lateral rigidity and in the transporting position;

FIGURE 3 is a sectional view along line III—III of FIGURE 2;

FIGURES 4 and 5 are partial views similar to FIGURE 2, with provision for lateral motion in the two terminal positions;

FIGURE 6 is a top view of the lower guide rods with lateral bracing lockable by an auxiliary device;

FIGURE 7 is a partial view of the lateral brace on an enlarged scale;

FIGURE 8 is a sectional view along line VIII—VIII of FIGURE 7;

FIGURE 9 is a partial lateral view with a locking element actuated by auxiliary power;

FIGURE 10 is a section along line X—X of FIGURE 9;

FIGURE 11 is a partial lateral view with a locking element pivotable by a rotary engine, FIGURE 12 is a section along line XII—XII of FIGURE 11;

Figures 13, 14:
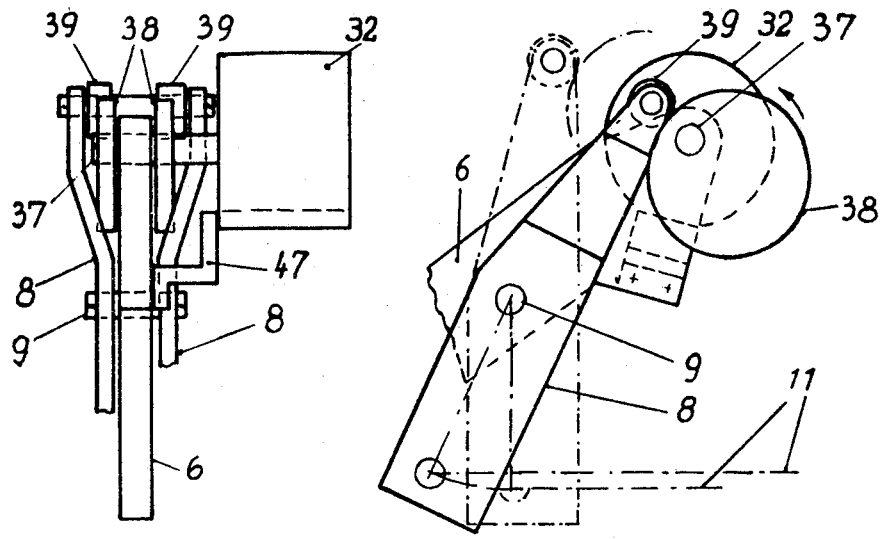
FIGURE 13 is a view of an embodiment of the present invention with a curved locking element.
FIGURE 14 is a lateral view of the embodiment according to FIGURE 13.

In accordance with FIGURE 1, the lower lift guide rods 3 of a coupling linkage, preferably a three-point linkage, are pivoted to the housing 1 of a tractor or a similar agricultural motor vehicle, at fulcrums 2 fashioned as universal joints. The ends of the lower guide rods 3 which engage with the implement (shown in dot-dash lines in FIGURE 1) are likewise provided with spherical connecting elements 4, or with rapid-connecting elements of a quick-action connector, for connecting any desired working implements thereto. Each of the flared axle tubes 5 carries a supoprting arm 6; to the latter, a supporting strut 7 is pivotally connected, which strut is pivotally attached, at its other end, with the lower guide rod 3 pertaining thereto. This supporting strut forms a radius rod, the short strut section 8 of which is rotatably mounted to the supporting arm 6 by means of a bearing bolt 9.

The downwardly extending arm 8' of the two-armed short strut section 8 is pivotally-connected, by means of a connecting pin 10 serving as the pivot axis, with the long strut section 11 of the radius rod 7 (FIGURE 2). The supporting arm 6 consists suitably of a plate-shaped part, on both sides of which, respectively, one lever arm is arranged, which lever arm forms the short strut section and is, itself, similarly plate-shaped (FIGURE 3). The long strut section 11, in turn, is supported on the connecting pin 10 between these two arms. Finally, a fixed abutment 12 is provided on the short strut section 8, which abutment, suitably made of flat material, is welded together with the two plates. An adjustable pawl 13 is mounted to the supporting arm 6, which pawl is pivotable about a trunnion 14, and serves as a locking element. The pawl 13 is provided with two abutment surfaces 13' and 13", one of these, namely abutment surface 13', positively abutting an arm 8", extended beyond the bearing bolt 9, of the short strut section 8, in the locking position (FIGURE 2) of the pawl 13, and the other of these, namely abutment surface 13", positively abutting the same arm 8" in the release position of the pawl 13, pivoted in the clockwise direction (FIGURES 4 and 5). The long strut section 11 thus represents a diagonal support, the terminal positions of which are determined, in case of lateral rigidity as well as lateral mobility, by the abutment surfaces 13' and 13" of the pawl 13. The adjustment range of the pawl 13 is defined by additional stops 15. In order to retain the pawl 13 in the respective position, a spring 16 is provided, which spring is moved through the dead-center position during the movement from the locked position of the pawl 13 into the released position thereof, and vice versa. The pawl 13 is finally provided with an operating arm 17, which latter can be controlled from the driver's seat either directly or by way of an appropriate linkage.

In FIGURE 2, the locking position of the pawl 13 is illustrated in full lines; in this position, the lateral mobility of the implement attached to the lower guide rods 3 is precluded. In this position, the arm 8' of the short strut section 8 of the supporting strut 7 contacts the abutment surface 13' at the pawl 13, thereby preventing a further pivotal movement in the clockwise direction. In this position, the connecting pin 10 is coaxial to the axis of the two fulcrums 2 of the lower guide rods 3. As a result, when the lower guide rods 3 move up and down, there is no change in position whatsoever between the latter and the respective supporting strut 7, i.e., lateral rigidity prevails in the entire pivoting range of the lower guide rods 3. Since the supporting struts 7 are adapted to absorb compressive forces, a horizontal lateral mobility of the ends of the guide rods is precluded over the entire vertical pivoting range thereof, with the two supporting struts 7 cooperating.

When the pawl 13 is pivoted into the release position (FIGURES 4 and 5), the short strut section 8 can move freely about the bearing bolt 9. Upon a lateral movement of the implement in the direction of the respective lateral brace 7, the short strut section 8 is pivoted in the clockwise direction, as illustrated in FIGURE 4. At the end of the permissible lateral mobility range, the arm 8" engages the abutment surface 13" of the pawl 13 and prevents any further movement in this direction. The short strut section 8 of the other side simultaneously executes a corresponding counter-movement, as shown in FIGURE 5. The bearing pressures here are also effective as compressive forces exclusively in the respective long strut section 11 of the supporting strut 7, which forces are transmitted, by means of the short strut section 8 and the pawl 13, to the supporting arm 6.

When the lower guide rods 3 are pivoted upwardly into the transporting position, as shown in full lines in FIGURE 2, the long strut sections 11 of both supporting struts 7 contact the stops 12 of the short strut section 8 thereof and thus form a rigid unit. The short strut sections 8, in this arrangement, assume a position corresponding to the locking position, wherein the connecting bolt 10, serving as the pivot axis, is disposed coaxially with respect to the fulcrums 2 of the lower guide rods 3. A lateral movement in the transporting position is, therefore, automatically precluded even if the pawl 13 is in the release position (shown in dot-dash lines in FIGURE 2). The bearing bolt 9 for the short strut section 8 is advantageously arranged, as seen in lateral view, approximately vertically above the fulcrums 2 of the lower guide rods 3.

It can be seen that the change-over from lateral rigidity to lateral mobility and vice versa is accomplished exclusively by pivoting the pawl 13, if desired, from the driver's seat. Even in the laterally-mobile mode, lateral rigidity is effected when the implement is raised into the transporting position, this being accomplished automatically by positive coupling of the two strut sections 8 and 11. On the other hand, the arresting of the short strut section 8 by the pawl 13 excludes, in the laterally-rigid mode, any change in length between the lower guide rod 3 and the supporting strut 7, since the connecting pin 10, serving as the pivot axis between the short strut section 8 and the long strut section 11, extends coaxially with respect to the axis passing through the fulcrums 2 of the lower guide rods 3, so that lateral rigidity is maintained over the entire pivotal range.

The pawl 13 can, of course, also serve solely for the purpose of establishing lateral rigidity, whereby special stop faces are provided between the short strut section 8 and the supporting arm 6 in order to limit the deflection during lateral mobility, or the abutment 12 serves this purpose.

In a further embodiment of the present invention, the short strut section 8 can be of a one-armed construction, to which arm the long strut section 11 is pivotally connected. Accordingly, the powl 13 is appropriately disposed so that it also abuts arm 8. Finally, it is possible to place the pawl 13 and the short strut section 8 into such a relationship that the long strut section 11 has the effect of a hinged tie-rod.

In order to simplify the locking of the short strut section 8 and to be able to conduct this operation without having to dismount from the driver's seat, the upwardly-extending arm 8" of the short strut section 8 is provided, in accordance with FIGURES 6 to 8, with a guide 18 in the shape of an extended slot. A pin 19 of a piston rod 20 engages this guide in the manner of a detent. The piston rod 20, in turn, carries a piston 21 at its other end, which piston is guided in a cylinder 22 to be axially-displaceable therein. The cylinder 22 and the piston 21 thus form a servomotor 32. A hydraulic or pneumatic pressure medium can be introduced by way of a feed line 23 into the partial space present opposite the piston rod 20 on the other side of the piston 21. In order to return the piston 21 into the illustrated starting position, a spring 24 is provided which rests with its other end at the cover plate 25 of the cylinder 22. The cylinder 22 is joined to the supporting arm 6 by way of a pin 26, which pin is preferably eccentric.

The feed lines 23 for both sides of the vehicle lead to a common control valve 27 arranged in the proximity of the driver's seat 28 and thus readily operable by the driver. Of course, the control valve 27 can also be mounted at another suitable location, for example on, or in the vicinity of, the dashboard, or at the steering column.

In order to limit the pivoting range of the short strut section 8, stops 29 can be provided at the supporting arm 6. However, it is also sufficient to have the piston rod 20, in the starting position shown in FIGURE 7, serve directly for limiting the pivoting range of the short strut section 8. Toward this end, the pin 19, on the one hand, contacts the end of the guide 18 serving as the abutment 30, and the piston 21, on the other hand, contacts the end of the cylinder 22. In order to define the locking position, an annular abutment surface 31 is additionally arranged within the cylinder 22, whereupon piston 21 impinges.

The mode of operation of this device is such that, for producing lateral rigidity in the lower guide rods 3, the control valve 27 is actuated, so that pressure medium flows, via the feed lines 23, to both cylinders 22, and the pistons 21 of both servomotors 32 are displaced to such an extent that they abut the stop surfaces 31. Thereby, the pin 19 has been moved to the left from the starting position illustrated in FIGURE 7 to such an extent that it abuts, in the central position of the short strut section 8, the stop 30 of the guide 18. Since this mutual abutment of pin 19 and stop 30 is present on both sides, lateral motion of the lower guide rods 3 is prevented.

Suitably, the servomotors 32 are fashioned to be so powerful that the lower guide rods 3, if they are not in the central position at the instant of setting the control valve 27 for lateral rigidity, are urged into this central position by the force of the servomotors 32. After the locking position has been reached, the supply of pressure medium to the servomotors 32 is, of course, automatically interrupted, and a locking action, for example a hydraulic one, is provided.

In a further development of the invention, the servo member 20 can be coupled with differently-constructed servomotors 32, for example, with electromagnets or electric motors. In case of the latter, the servo member 20 can, for example, have the shape of a helical spindle axially-displaced by the rotation of the electric motor and locking the short strut section 8 in the manner described above.

In the embodiment of FIGURES 9 and 10, the servomotor 32 is directly connected to the pawl 13; this servomotor consists, for example, of cylinder 22 and piston 21, as set forth above, and is connected with the pawl 13 by means of the piston rod 20, constructed in the form of a servo member and a bolt 33. This servomotor 32 can be loaded, with the use of a return spring, on one side only or, as illustrated, on both sides, via two pressure medium conduits 45, so that the pawl 13 can be shifted selectively into the locking position, as shown, or into the rest position, indicated in dot-dash lines. The adjusting range of the piston 21 is defined by stops 46, while the cylinder 22 is mounted, by way of the pin 26, to a crosspiece 49 of the supporting arm 6.

In the embodiment of FIGURES 11 and 12, a rotary piston 35 guided in a housing 34 serves as the servomotor 32, the pivotal range of this rotary piston being limited by terminal abutments 36. The shaft 37 extended out of the housing 34 carries directly, for rotation therewith, the pawl 13 constructed in the form of a double lever. In this embodiment also, the rotary piston 35 can be under load unilaterally or bilaterally by means of two pressure medium lines 45. In the case of unilateral load, a return spring is appropriately arranged. The housing 34 is supported on the supporting arm 6 by means of a connecting flange 47.

It is also possible, for example, to connect the piston rod 20 of FIGURE 7 to a rotary motor by way of a crank. In the locking position of the pin 19, the crank and the piston rod 20 are suitably in the dead-center position.

Finally, the pawl can also be constructed in the form of a cam or eccentric disk 38, as shown in FIGURES 13 and 14. In order to attain an adjustment of the short strut section 8 which is as friction-free as possible, this strut section is provided with a roller 39 contacting the cam or eccentric disk 38. The latter is mounted on the shaft 37 for rotation therewith, in a manner described above. The shaft 37 is set into rotation by the servomotor 32, which latter, in turn, can be a rotary piston engine or an electric motor.

Figure 15:
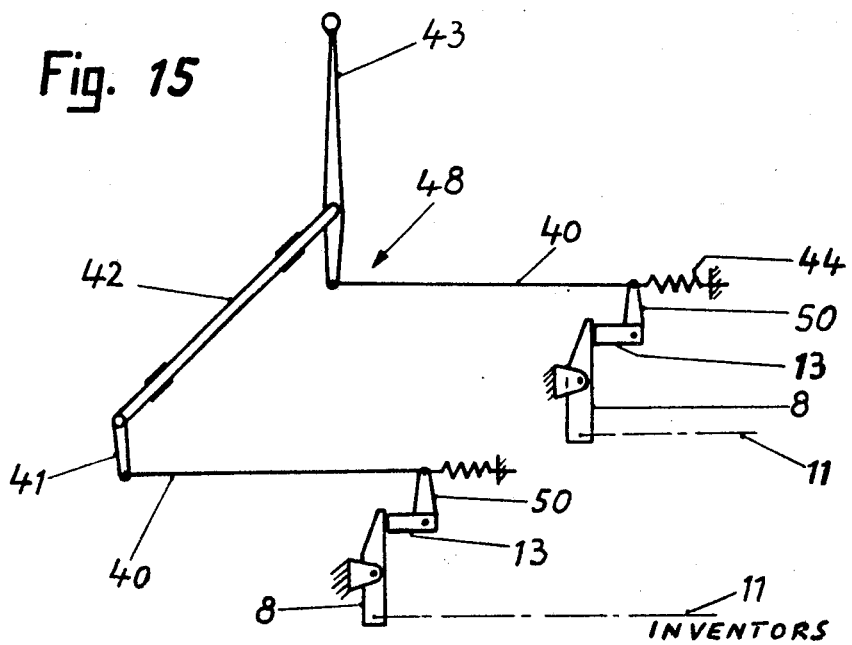
FIGURE 15 is a schematic representation of a mechanical actuating device in accordance with the present invention.

A combined actuation of the pawls 13 can also be attained by means of a mechanical linkage 48 (FIGURE 15) consisting, for example, of tie-rods 40 pivotally connected at crosspieces 50 of the pawls 13, as well as at lever arms 41. The latter are in a rigid, rotational engagement with each other by a connecting shaft 42 mounted to the vehicle housing, and can be pivoted together by a manual lever 43 to be operated from the driver's seat, so that the pawls 13 of both sides can be simultaneously actuated and deactivated. The return of the pawls 13 into their rest position is effected completely or partially by springs 44. Of course, these springs 44 can also be omitted if the tie rods 40 are constructed in the form of tie and push-rods.

It is furthermore possible to arrest the auxiliary device, i.e., the servomotor 32 or the linkage 48, in any desired intermediate position of the adjusting member 20 and secure same against motion, if desired, so that the attached implement thus exhibits a more limited lateral mobility. A special locking of the servomotor 32 need not be executed if, between the latter and the locking element, a self-locking transmission gear is provided, for example in the form of a worm gear.

As is readily apparent from the foregoing description, the lateral brace arrangement in accordance with the present invention provides for a simple and efficient conversion from lateral rigidity to lateral mobility and vice versa, which conversion can be effected exclusively by the actuation of a pawl. Further, the lateral brace structure is relatively simple and provides for absorption of high bearing forces. The novel structure eliminates the necessity for the diagonal bracing employed heretofore, for example, in the form of chains or the like between the lower guide rods of a tractor, thereby leaving this space free. This latter feature is particularly advantageous when a mortise shaft and quick-action couplings are employed.

It should be understood that various modifications in the details, materials, structure and arrangement of elements, which have been described and illustrated hereinabove in order to explain the nature of the invention, may be made by those skilled in the art without departing from the principle and scope of the invention.

We claim:

1. A lateral brace arrangement for the pivotally-supported lower lift guide rods of tractors or like, for preventing or limiting the lateral motion of an implement attached thereto, comprising:
    first strut means pivotally-attached, on each side of the tractor, to a part thereof at a point disposed laterally relative to the fulcrum of the corresponding lower lift guide rod on the tractor,
    second strut means, connected, at one end thereof, to the corresponding lower lift guide rod, and pivotally-connected, at the opposite end thereof, to the free end of a respective one of said first strut means,
    a first pivot axis defined by the two points of pivotal attachment of said lower lift guide rods with said tractor,
    a second pivot axis defined by the two points of pivotal connection between said first strut means and said second strut means,
    said first pivot axis, being relatively fixed at a location within the path of motion of said second pivot axis,
    and adjustable locking means adapted to lock said first strut means in aposition such that said first pivot axis and said second pivot axis are coaxially-disposed.

2. A lateral brace arrangement according to claim 1, wherein the points of pivotal connection between said first strut means and the respective side of the tractor are disposed, when viewed from a lateral position, approximately vertically above the corresponding fulcrums of the lower lift guide rods at the tractor.

3. A lateral brace arrangement according to claim 1, further comprising stop means limiting the relative rotation between said first strut means and said second strut means.

4. A lateral brace arrangement according to claim 3, wherein said stop means includes an abutment member affixed to said first strut means positioned within the path of rotation of said second strut means relative to said first strut means.

5. A lateral brace arrangement according to claim 3, wherein the relative angular disposition of said first and second strut means at the point where the relative rotation therebetween is limited defines a transporting position.

6. A lateral brace arrangement according to claim 3, wherein said second strut means is adapted to withstand compressive forces applied thereto, and for positive engagement with said stop means, and said first strut means is adapted for positive engagement with said adjustable locking means.

7. A lateral brace arrangement according to claim 1, wherein said adjustable locking means includes a pawl and spring connected thereto, said spring exerting tension on said pawl when said pawl is displaced in either direction from a dead-center position, a displacement of said pawl in one direction from dead-center defining a locking position, while a displacement in the other direction from dead-center defines a release position.

8. A lateral brace arrangement according to claim 7, further comprising linkage means operatively connecting said pawl with actuating means positioned in the region of the driver's compartment of the tractor.

9. A lateral brace arrangement according to claim 7, wherein each of said first strut means includes a two-armed lever, one arm of which is pivotally connected to said second strut means, the other arm being adapted to engage a first stop surface of said pawl.

10. A lateral brace arrangement according to claim 9, wherein said first strut means is adapted to engage a second stop surface of said pawl when said pawl is in a release position, thus limiting lateral mobility of an implement connected to said lower lift guide rods.

11. A lateral brace arrangement according to claim 7, wherein each of said first strut means includes a one-armed lever pivotally connected to said second strut means and adapted to engage a stop surface of said pawl.

12. A lateral brace arrangement according to claim 1, further comprising an auxiliary device, remotely operable, by means of suitable controls in the region of the driver's compartment of the tractor, to cooperate with said adjustable locking means and effect a locking of each of said first strut means.

13. A lateral brace arrangement according to claim 12, wherein said auxiliary device includes a mechanical linkage adapted for selectively locking and releasing, simultaneously, said first strut means on each side of the tractor.

14. A lateral brace arrangement according to claim 12, wherein said auxiliary device includes a servomotor and an auxiliary power source, said servomotor being operatively connected with said adjustable locking means.

15. A lateral brace arrangement according to claim 14, wherein said first strut means includes a guide member and said servomotor includes a locking element, said locking element engaging within said guide member, and said locking element engages a stop surface of said guide member in said locking position.

16. A lateral brace arrangement according to claim 15, wherein said servomotor includes a pressure cylinder, a unilaterally-loaded piston supported for axial movement therein, and a return spring operatively connected with the free end of said piston.

17. A lateral brace arrangement according to claim 14, wherein said servomotor includes a rotary engine, and further comprising self-locking gear means operatively connecting said rotary engine with said adjustable locking means.

18. A lateral brace arrangement according to claim 17, wherein said adjustable locking means includes a helical spindle adapted for axial displacement.

19. A lateral brace arrangement according to claim 12, wherein said adjustable locking means includes a pivotable eccentric.

20. A lateral brace arrangement according to claim 14, wherein said servomotor is mounted upon a support arm to which said first strut means are connected.

References Cited

UNITED STATES PATENTS

| | | | |
|---|---|---|---|
| 2,640,708 | 6/1953 | Fraga | 280—474 X |
| 2,698,564 | 1/1955 | Sawyer | 280—461 |
| 2,935,145 | 5/1960 | Du Shane | 172—275 |
| 3,056,458 | 8/1962 | Gray | 172—450 X |
| 3,207,529 | 9/1965 | Harper | 280—474 X |
| 3,425,715 | 2/1969 | Weitz | 280—474 X |

FOREIGN PATENTS 236,156    8/1964    Austria.

OTHER REFERENCES

German printed application, No. 1,254,397, Nov. 16, 1967, Spennemann.

LEO FRIAGLIA, Primary Examiner

U.S. Cl. X.R.

172—450; 280—461